United States Patent [19]
Cerutti

[11] 4,262,184
[45] Apr. 14, 1981

[54] WELDING OF ALUMINUM GRATING AND THE LIKE

[75] Inventor: Henry P. Cerutti, Mahoning Township, Armstrong County, Pa.

[73] Assignee: Blaw-Knox Equipment, Inc., Pittsburgh, Pa.

[21] Appl. No.: 971,412

[22] Filed: Dec. 20, 1978

[51] Int. Cl.³ .................................................. B23K 11/16
[52] U.S. Cl. .................................. 219/58; 219/91.21; 219/118
[58] Field of Search ................... 219/93, 91.21, 118, 219/58

[56] References Cited

U.S. PATENT DOCUMENTS

| | | |
|---|---|---|
| 1,228,789 | 6/1917 | Lachman . |
| 1,342,818 | 6/1920 | Lachman . |
| 1,706,892 | 3/1929 | Lachman . |
| 1,788,817 | 1/1931 | Wilson . |
| 1,973,113 | 9/1934 | Schulz ................................ 219/58 |
| 2,006,929 | 7/1935 | Nagin . |
| 2,021,477 | 11/1935 | Bohn ................................ 219/91.21 |
| 2,046,458 | 7/1936 | Johnson . |
| 2,129,428 | 9/1938 | Johnson . |
| 2,179,545 | 11/1939 | Edge ................................ 219/58 |
| 2,275,104 | 3/1942 | Greulich . |
| 2,275,105 | 3/1942 | Greulich . |
| 2,437,186 | 3/1948 | Collins . |
| 2,469,897 | 3/1949 | Schilling . |
| 2,577,123 | 12/1951 | Hitchens . |
| 2,937,262 | 5/1960 | Baxter . |
| 3,196,247 | 7/1965 | Piercy . |
| 3,492,624 | 1/1970 | Oakley ................................ 219/93 |
| 3,592,993 | 7/1971 | Benett . |
| 3,617,677 | 11/1971 | Ritter ................................ 219/58 |
| 3,751,626 | 8/1973 | Binger . |
| 4,048,463 | 9/1977 | Bennett . |

*Primary Examiner*—E. A. Goldberg
*Attorney, Agent, or Firm*—Buell, Blenko, Ziesenheim & Beck

[57] ABSTRACT

The specification discloses a process for manufacture of welded aluminum grating and the like wherein weldable grade aluminum cross bars having a form similar to a wedge having a rounded apex are abutted against bearing bars and a voltage is applied through the parts to create resistance welds. Special preparation such as cleaning or notching of the area of the aluminum bars that are to be welded are eliminated.

3 Claims, 3 Drawing Figures

WELDING OF ALUMINUM GRATING AND THE LIKE

This invention relates to manufacture of aluminum grating and the like by resistance welding of cross bars having a curved face to bearing bars which are transverse to the cross bars.

Resistance, spot, and seam welding of aluminum are not new. Such processes have long been used in the manufacture of cooking utensils, tanks, bridge flooring and many aircraft components as well as grating. As is well known, however, the welding of aluminum presents some difficulties.

The strength of welds in aluminum alloys will vary with the alloy and the thickness of the weld. In addition, weld quality and weld strength may be affected by the presence of an aluminum oxide coating on the workpiece prior to being welded. The oxide coating forms almost instantaneously when aluminum is exposed to the atmosphere. Aluminum oxide has a high and somewhat erratic electrical resistance that affects the amount of heat produced in the metal during resistance welding. Also the oxide will not satisfactorily weld to aluminum. Accordingly, the oxide causes welds to be lower in shear strength, variable in quality and erratic in shape. To overcome that problem numerous cleaning and other surface preparation procedures, some of which are quite elaborate and expensive, have been developed. Such procedures add significant expense to manufacturing and are, at the least, difficult to use in some locations. Also, the control of them is difficult and there is an inherent risk of a defective or weakened weld which may be detected only by a failure in service.

I propose to minimize the detrimental effect of the oxide coating on the aluminum workpieces to be resistance welded into gratings by shaping the workpieces before they are assembled and thereafter welding them together. Surface preparation is thereby eliminated as are the detrimental effects of aluminum oxide. I provide a plurality of bearing bar members of weldable grade aluminum. I further provide a plurality of cross bar members which are arranged transversely to the bearing bar members. The respective groups of bars are placed in parallel relationship with the bars in one group being arranged transversely to the bars in the other group. The bars are then formed into a unitary grating by applying heat and pressure at the points of intersection.

The bearing bars may be of a cross section having a size and cross section needed for the strength required, e.g. rectangular bars, I-bars, or T-bars. I further provide a plurality of cross bars each of whose cross section is a wedge having a rounded apex. The rounded apex provides better welding characteristics. I prefer to provide a plurality of cross bar members, each having a tread surface and a curved surface in which the curvature gradually increases at greater distance from a tread surface of the cross bar. In other words the radius of curvature descreases in moving along the curved surface away from the tread surface on the cross bar. In a presently preferred embodiment of the invention, the upper surface of the cross bar member is flat and a curved surface intersects the upper surface. Thus, in cross section, the bar is in the form of a parabola intersecting a flat surface. Other sections may be used in which the curved surface has increasing curvature away from the flat face such as a catenary or one-half of an ellipse. I place the bars in juxtaposition, and by application of pressure and flow of electric current through the points of intersection weld the bars into a unitary grating.

Other details, objects and advantages of the invention will become apparent from the following description of a present preferred embodiment of the invention.

In the accompanying drawings, I have illustrated a present preferred embodiment of the invention in which.

Figure 1:
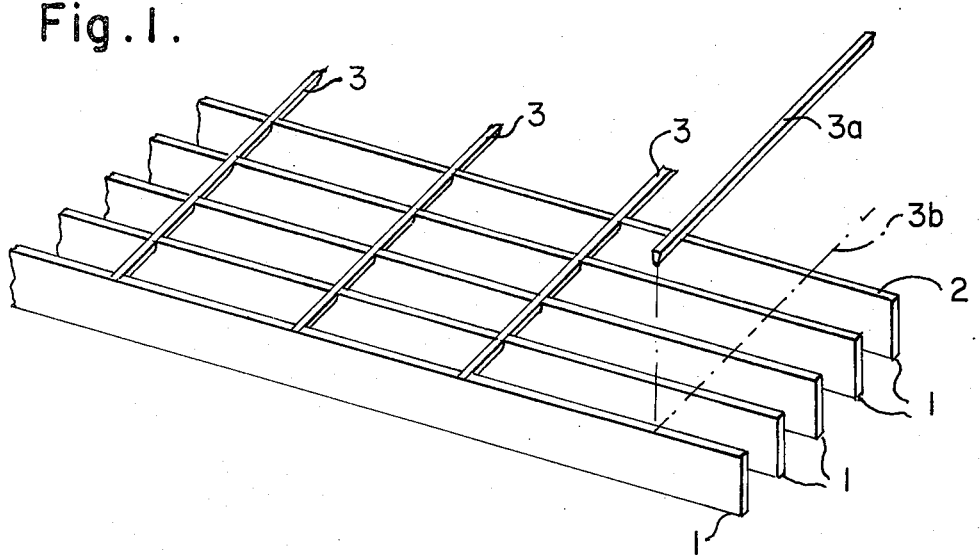
FIG. 1 is a fragmentary view of a grating made in accordance with the invention.
Figure 2:
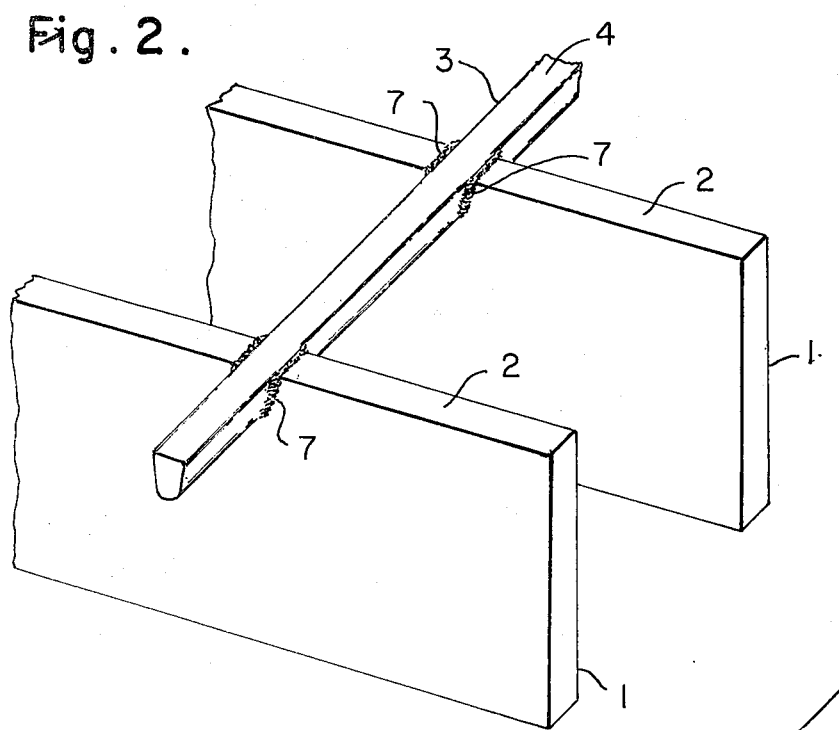
FIG. 2 is an enlargement of a portion of the view shown in FIG. 1.
Figure 3:
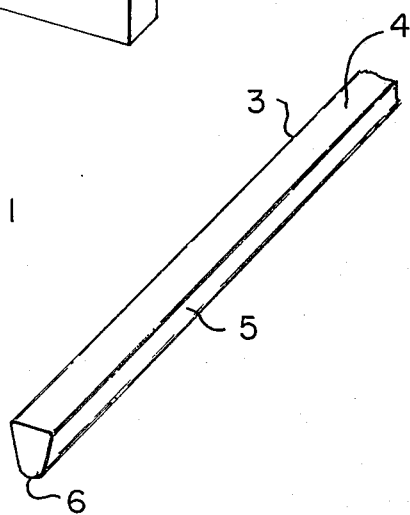
FIG. 3 is a perspective view of one of the cross bar members.

As shown in FIG. 1, the grating is comprised of a group of bearing bar members 1 arranged in parallel relationship. The bearing bars are illustrated in rectangular cross-section but they may also be in other shapes such as an I-bar or a T-bar. Each bearing bar has a flat upper tread surface 2 which may be notched or serrated to provide better traction for walking on the grating. Cross bars 3 are positioned at spaced intervals and at a right angle to the axis of bearing bars 1. The location of one cross bar 3a, not fitted in place, is shown by a chain line 3b. It will be seen that the upper surfaces 2 of bearing bars are not notched or fitted to receive cross bars 3.

Each cross bar 3 has a flat tread face 4. In cross section, each cross bar 3 has a curved lower surface 5 extending from one side to the other of tread face 4. The curved surface is one of decreasing radius as the distance from the flat surface increases. Preferably an end view of surface 5 approximates a parabola in which the greatest curvature, i.e., the shortest radius of curvature, is at the bottom of cross bar 3 as indicated by reference number 6. Other similar shapes such as a catenary or a portion of an ellipse might be used in place of a parabola. The curvature decreases on the sides of cross bar 3. Accordingly, the cross section approximates a wedge whose point has been rounded off.

The grating is assembled by locating the bearing bars 1 in a jig or fixture which will hold them firmly in spaced parallel relationship. Cross bars 3 are then placed in spaced position with the bottom areas 6 of each cross bar resting on the flat upper faces 2 of the bearing bars 1. Electrodes are placed above cross bars 3 to apply pressure and an electrical potential to the cross bars, with other electrodes being connected to the bearing bars to complete the circuit.

As the voltage is applied, heat will be generated at the points of intersection where the electrical resistance is highest. Melting will begin at the points of contact and will spread outwardly into both the cross bars and the bearing bars. The melting will generally be more significant in the cross bar due to its smaller cross section. As the bars are forced together under pressure, the melted metal will be forced outwardly carrying the aluminum oxide with it. The consequence of the melted metal flow is that substantially all of the aluminum oxide which was on the surface of the bearing bar and cross bar prior to welding will be caused to flow away from the center of the weld and to be deposited at the exterior of the weld. Such a weld, having relatively little aluminum oxide in it, will be of good quality. When the weld is completed each of the cross bars 3 will be embedded in bearing bars 1 with tread surfaces 2 and 4 being substantially in the same plane. A fillet 7 will be formed around each junction point where the metal has flowed during welding.

The cross sectional shape of the cross bar members is critical to satisfactory practice of the invention. If, for example, a triangular shape bar were used, the initial heating will be along a line. The melting of the bearing bars will be in too narrow a zone to enable the cross bars to be fully embedded in molten metal. If, on the other hand, a rectangular cross bar is used, the contact area may be too large and have too low a resistance to raise the pieces to welding temperature without using excessive current. Moreover when melting does take place in the bearing bars, the melted area will be excessively large for the cross bars and will likely cause a reduction in metal around the weld area leading to loss of strength. The use of a cross bar as shown in the drawings causes localized heating of the cross bar and the bearing bars. Early heating of the cross bars brings a much larger area into contact, causing heating and melting in zone of proper width in the bearing bars. The slight widening of the cross bars above the rounded apex causes them to "seat" against the metal of the bearing bars while still developing a sound weld when the bars are pressed together.

The bearing bars and cross bars should be composed of weldable grade aluminum. The exact grade chosen will depend upon the strength that is desired. I have found 60 series grades to be suitable for use in making commercial aluminum grating.

The strength of the finished product can also be altered by changing the size of the cross bars and bearing bars. I prefer to use bearing bars having a ¼" thickness and a width of 1" to 2½" for most commercial grating. Additionally, cross bars having a width of 5/16" and a parabolic face having a 5/16" height are quite satisfactory. Cross bars having a steep parabolic face approaching that of a triangle have been found to be less useful because the tip of the bar breaks off during handling. Moreover, an essentially line contact limits heating to a narrow width and does not provide sufficient hot metal for insertion of the cross bars to full depth in the bearing bars.

In utilizing the process there is no need to engage in any special cleaning or surface preparation of the workpieces. The bars can be welded in the form they are received from the mill.

While I have illustrated and described a present preferred embodiment of the invention and have described a present preferred method of practicing the same, it is to be distinctly understood that the invention is not limited thereto but may be otherwise variously embodied and practiced within the scope of the following claims.

I claim:

1. A process for resistance welding of aluminum grating and the like comprising the steps of:
   a. selecting a plurality of weldable grade aluminum bearing bars having an aluminum oxide coating;
   b. selecting a plurality of weldable grade aluminum cross bars having an aluminum oxide coating and whose cross section is a wedge having a rounded apex;
   c. bringing the rounded apexes of the cross bars into juxtaposition with the bearing bars;
   d. applying pressure to the bearing bars having an aluminum oxide coating and cross bars having an aluminum oxide coating to force them together; and
   e. applying a voltage across the bars to cause current to flow between the bearing bars and the cross bars whereby the bars are welded together at the points where they intersect to form a grating.

2. The process of claim 1 in which at least some of the cross bars have a plane surface and a curved surface whose curvature increases with distance from the plane surface.

3. The process of claim 2 in which the cross bar curved surface approximates a parabola.

* * * * *